Aug. 21, 1962 C. A. LASCH, JR., ET AL 3,050,617

THERMOCOMPRESSION LEAD BONDING APPARATUS

Filed Oct. 31, 1960 5 Sheets-Sheet 1

INVENTORS
Cecil A. Lasch, Jr.
Walter G. Johnson
BY [signature]
Attorneys

INVENTORS
Cecil A. Lasch, Jr.
Walter G. Johnson
BY
[signature]
Attorneys

INVENTORS
Cecil A. Lasch, Jr.
Walter G. Johnson
BY [signature]
Attorneys

INVENTORS
Cecil A. Lasch, Jr.
Walter G. Johnson
BY
Flehr and Swain
Attorneys

BY

INVENTORS
Cecil A. Lasch, Jr.
Walter G. Johnson

Attorneys

United States Patent Office 3,050,617

Patented Aug. 21, 1962

3,050,617
THERMOCOMPRESSION LEAD BONDING APPARATUS

Cecil A. Lasch, Jr., Sunnyvale, and Walter G. Johnson, Santa Clara, Calif., assignors to Electroglas, Inc., Redwood City, Calif., a corporation of California Filed Oct. 31, 1960, Ser. No. 66,207
24 Claims. (Cl. 219—85)

This invention relates to a lead bonding apparatus and more particularly to a thermocompression lead bonding apparatus for forming bonds between leads and certain elements in solid state devices.

Apparatus heretofore available for making thermocompression bonds in solid state devices has been very limited and, generally, not very satisfactory. In addition, the apparatus which has been available is generally incapable of being used for forming bonds with very fine wire. It has been necessary to use finer wire for the leads because of the decreasing size of the geometry being utilized in solid state devices. Also, the apparatus heretofore provided has been subject to vibration which has made it very difficult to position the lead properly before the bond is made.

In general, it is an object of the invention to provide a thermocompression lead bonding apparatus which overcomes the above-named disadvantages.

Another object of the invention is to provide a lead bonding apparatus of the above character in which no vibration is imparted to the tool during lowering of the tool into engagement with the lead and the element to which the lead is to be bonded.

Another object of the invention is to provide an apparatus of the above character in which the force of gravity is utilized for lowering the tool.

Another object of the invention is to provide an apparatus of the above character in which the pressure applied by the tool to the lead is determined by the size of a weight carried by the tool.

Another object of the invention is to provide an apparatus of the above character in which means is provided for controlling the rate of drop of the tool.

Another object of the invention is to provide an apparatus of the above character in which the tool is shifted with respect to the header holder to properly position the tool.

Another object of the invention is to provide an apparatus of the above character in which particularly novel means is utilized to permit shifting of the tool relative to the header holder.

Additional objects and features of the invention will appear from the following description in which the preferred embodiment is set forth in conjunction with the following drawings.

Referring to the drawings.

Figure 1:
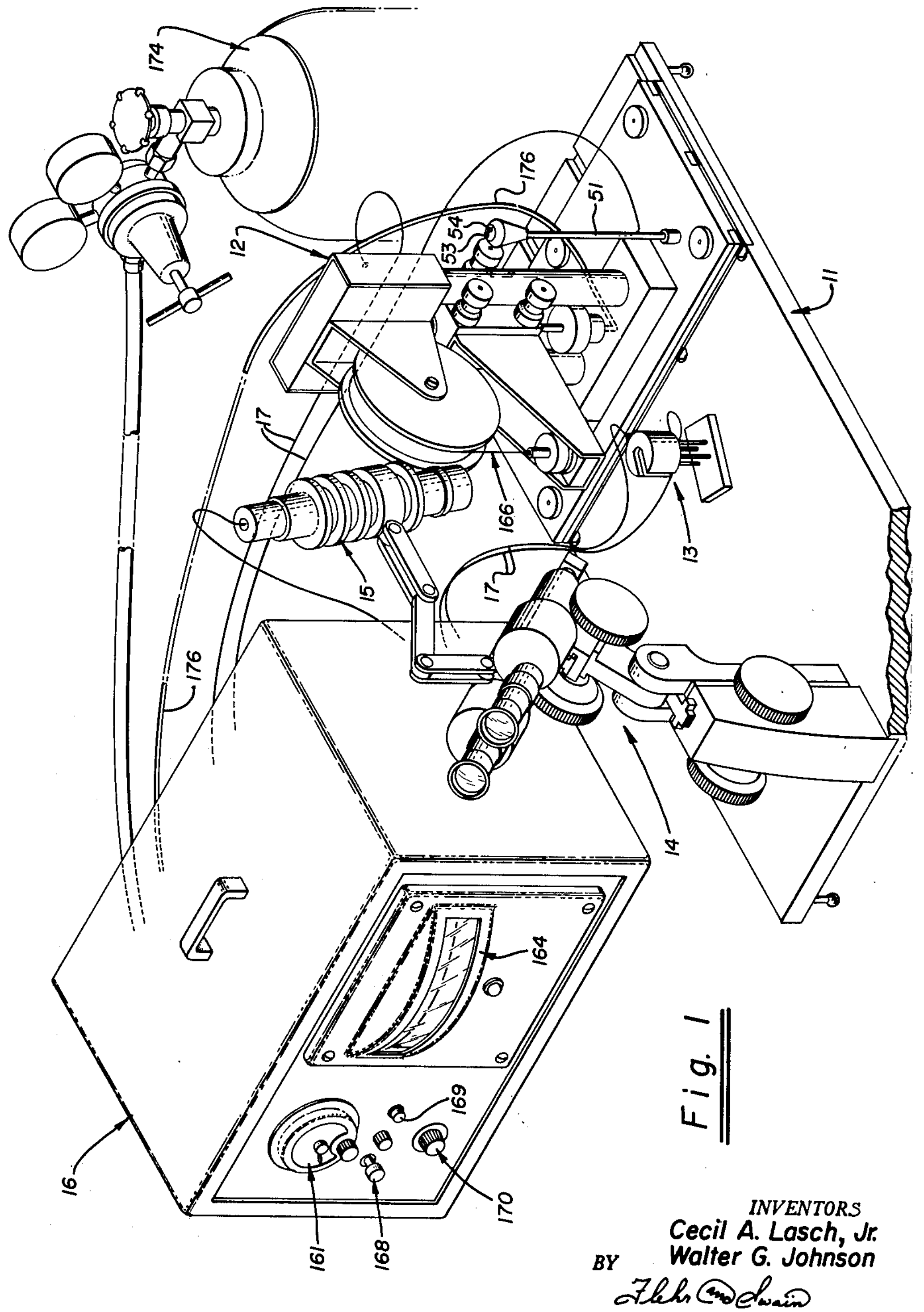
FIGURE 1 is an isometric view showing a thermocompression lead bonding apparatus incorporating our invention.

In general, our thermocompression lead bonding apparatus consists of a framework with a tool slidably mounted in said framework for vertical or up and down movement. During use of the tool, means is provided for releasing the tool so that it can drop by force of gravity. Means is provided for controlling the rate of fall of the tool during its downward travel so that it drops smoothly. The tool drops into engagement with the lead and compresses the lead against the element to which the lead is to be bonded. The tool is weighted so that the bonding pressure is determined by the weight carried by the tool. Means is also provided for permitting shifting of the tool relative to the element to which the lead is to be bonded.

More in particular, our thermocompression lead bonding apparatus consists of a base plate 11 which carries a thermocompression lead bonding machine 12, a header holder 13, and a microscope 14 with a lamp 15. Our apparatus also includes a control cabinet 16 which is connected to the lead bonding machine 12 by a cable 17.

The base 11 for the machine consists of a base plate 21 formed of a suitable material such as aluminum. This base plate is provided with four laterally spaced milled slots 22 extending longitudinally of the plate and commencing at a point which is slightly more than one-half across the length of the base plate. Longitudinal bearing members or cages 23 of suitable material such as brass are mounted in the slots 22 and have the same dimensions as the slots 22 except that they have a thickness which is greater than the depth of the slots so that they extend above the top of the base plate 21 for a purpose hereinafter described. These bearing cages are affixed to the base plate 21 by suitable means such as screws 24.

The longitudinal bearing members 23 are provided with a plurality of elongate slots 26 extending longitudinally of the bearing members which form races or cages for ball bearings 27 which have a diameter slightly greater than the depth of the slots 26. The slots 26 have a predetermined length and normally have a length to accommodate the maximum movement required in our machine as hereinafter described. Five levelling screws 28 are mounted on the bottom of the base plate with one of the screws in each corner and one being in the center of the base plate for leveling the lead bonding machine.

Figure 2:
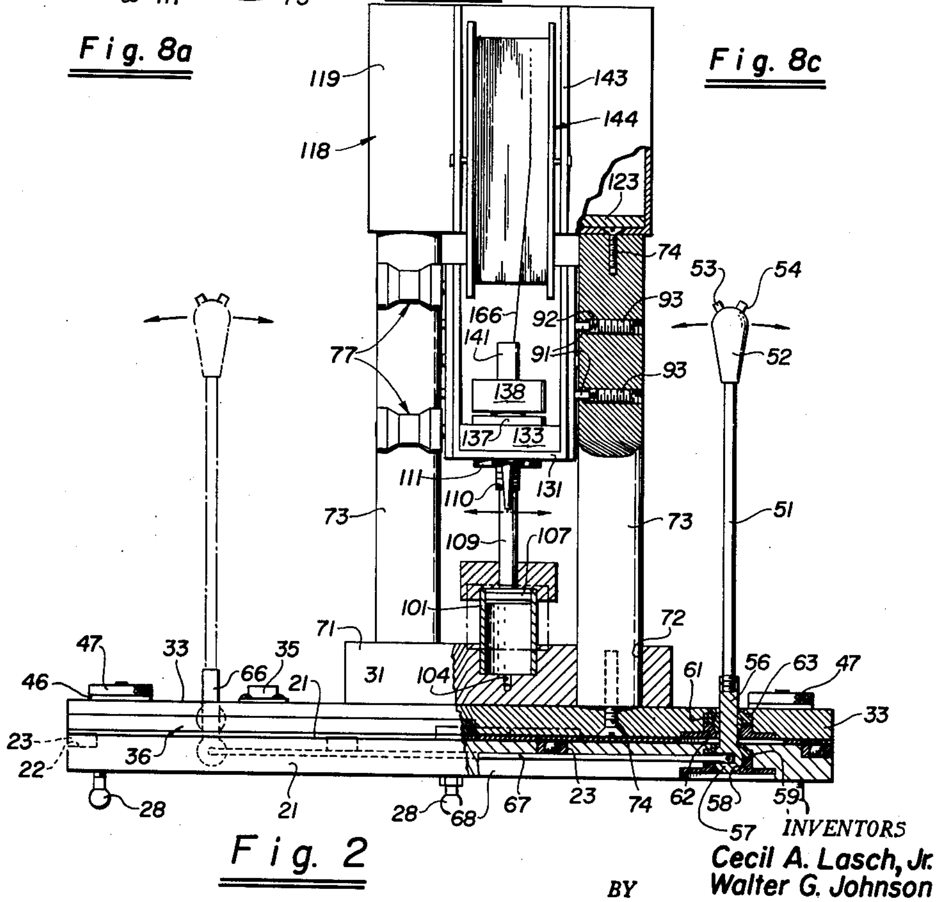
FIGURE 2 is a front elevational view with certain parts broken away of our thermocompression lead bonding machine.

An idler plate 31 is provided with four laterally spaced milled slots 32 extending longitudinally thereof and which seat on the bearing members 23 in the base plate 21. Since the ball bearings 27 extend slightly above the bearing members 23, the idler plate can be shifted with ease forwardly and rearwardly with respect to the base plate 21. However, the idler plate cannot be shifted to the right or left as viewed in FIGURE 2 because the slots 32 are seated on the bearing members 23.

A carriage plate 33 overlies the idler plate and is provided with three longitudinally spaced milled slots 34 extending laterally of the plate. The carriage plate is provided with a balance level 35 to facilitate leveling of the carriage plate 33. Three transverse bearing members 36 are secured in the slots 34 by suitable means such as screws 37. Each of the bearing members 36 is provided with slots 38 similar to the slots 26 in the bearing members 23 and carry ball bearings 40. The idler plate is provided with milled slots 39 which seat over the portions of the bearing members 36 which extend below the bottom surface of the carriage plate 33. The ball bearings 37 extend slightly below the bottom surface of the bearing members 33 and engage the idler plate to permit transverse movement of the carriage plate. The slots 39 in the idler plate prevent longitudinal movement of the carriage plate with respect to the bearing members 36. Thus, it can be seen that longitudinal or back and forth movement of the carriage plate is provided by movement of the idler plate relative to the base plate and that transverse or sidewise movement of the carriage plate is permitted by the transverse movement of the carriage plate relative to the idler plate.

Figures 3, 10:
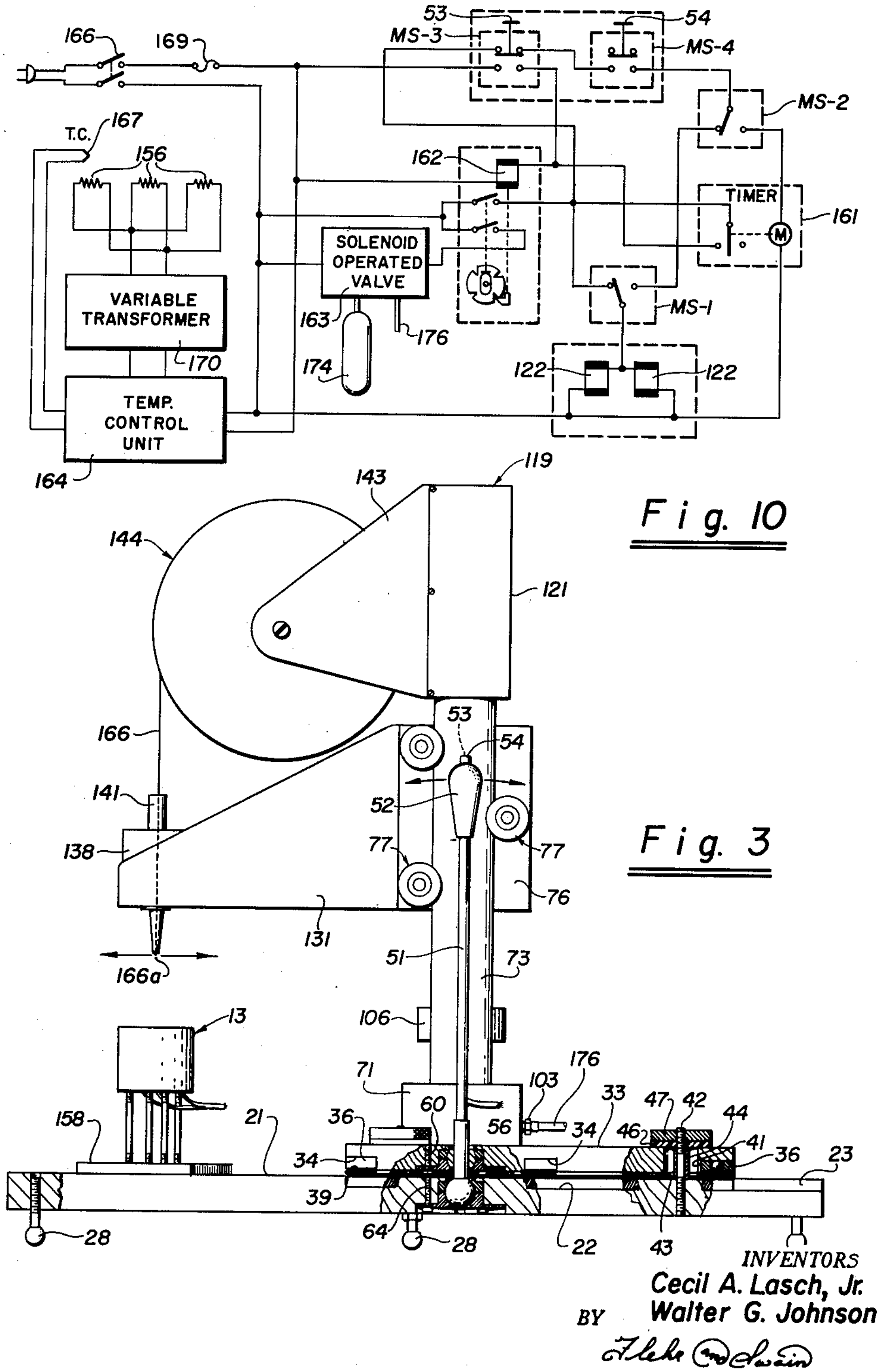
FIGURE 3 is a side elevational view with certain parts broken away of the thermocompression lead bonding machine shown in FIGURE 2.
FIGURE 10 is a circuit diagram with certain parts schematically illustrated of our thermocompression lead bonding apparatus.
Figure 5:
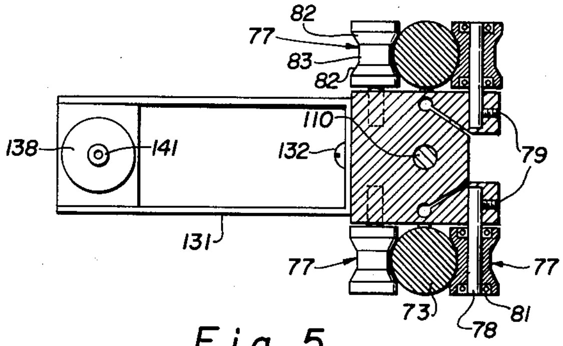
FIGURE 5 is a cross-sectional view taken along the line 5—5 of FIGURE 4.
Figure 6:
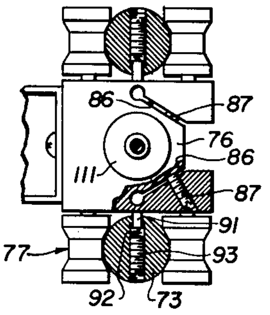
FIGURE 6 is a cross-sectional view taken along the line 6—6 of FIGURE 4 with certain parts broken away.

The carriage plate 33 is also provided with five holes 41, two in the front and three in the back, which accommodate hold-down screws 42 threaded into the base plate 21 as shown particularly in FIGURE 3. The idler plate 31 is also provided with corresponding holes 43 which accommodate the hold-down screws. The holes 41 and 43 have a diameter which is substantially greater than the diameter of the screws 42 and, in fact, have a diameter which is slightly greater than the length of the slots 26 and 36 in the longitudinal and transverse bearing members 23 and 33, plus the diameter of the spacer members 44 mounted on the screws 42 so that the cylindrical surfaces which define the holes at no time come in contact with the spacer members 44 during back and forth, and sidewise movement of the carriage plate 33, as hereinafter described.

A washer 46 of a suitable unctuous material such as Teflon is mounted on the hold-down screws 42 above the spacer members 44 and above the carriage plate and is held in place by hold-down nuts 47. The use of the nuts 47 together with the Teflon washers 46 makes it possible to adjust the amount of friction between the Teflon member and the carriage plate 33 to thereby determine the ease of movement of the carriage plate in a back and forth direction or a sidewise direction, while at the same time permitting smooth regular movement without binding which might cause jerking or jarring motion.

Means is provided for shifting the carriage plate 33 with respect to the base plate 21 and consists of a control rod or manipulator lever 51. The control lever 51 is provided with an operating handle 52 which contains two switches MS–3 and MS–4 hereinafter described which are provided with operating buttons 53 and 54. The control of manipulator lever 51 is threaded into a shaft 56 which has a ball 57 on its lower end. The ball 57 is seated within a socket assembly provided in the base plate 21 which consists of a lower socket 58 and an upper socket 59 fixed to the base plate by cap screws 60.

Another ball 61 is slidably mounted on the shaft 56 and is seated in a lower socket 62 and an upper socket 63 fixed in the carriage plate 38 by cap screws 64. Another shaft 66 identical to the shaft 56 is mounted on the other side of the base 11 of the machine and is mounted in the same manner as is shaft 56. The shaft 66 is connected to the shaft 56 by an idler or connecting rod 67. The rod 67 is seated in a recess 68 provided in each of the balls 57 and is pivotally connected to the shaft at 69 to provide a relatively rigid pivoted connection. The arrangement shown makes it possible to shift the manipulator lever 51 from the right hand side to the left hand side if the operator is left-handed. In addition, it has been found that the provision of the additional shaft 66 makes possible easier and truer movement of the carriage plate. This is true because the shaft 56 is mounted near one side edge of the carriage plate, and thus may have a tendency to cause a slight canting of the carriage plate. This tendency to cant is prevented by the other shaft 66 which is connected to the shaft 56 through the connecting rod 67.

A pedestal base 71 is secured to the carriage plate by suitable means such as screws (not shown). The pedestal base is provided with a pair of holes 72 in which are mounted a pair of support columns 73. The support columns 73 can be of any suitable type such as centerless ground stainless steel rod. The support columns 73 are also secured to the carriage plate 33 by suitable means such as screws 74. It is desirable that the support columns be perfectly round and that they be held in such a manner that they are exactly vertical when the carriage plate 33 is in a horizontal plane. It is also desirable that they be spaced apart a uniform predetermined distance.

A carriage block 76 is slidably mounted between the support columns 73 for vertical movement therebetween. Three rollers 77 are mounted on each side of the carriage block by pins 78 extending horizontally into the block and secured thereto by screws 79. The rollers 77 are carried on the pins 78 by ball bearing assemblies 81 provided on each end of the rollers. Each of the rollers is provided with a pair of inclined surfaces 82 and a flat surface 83 so that actually there are six points of contact between the rollers and each support column.

The carriage block 76 is provided with a pair of diagonal slots 86. Set screws 87 are threaded in the portion of the block adjacent the slots 86 and serve to provide means whereby those portions of the block carrying the rear roller of the rollers 77 can be sprung outwardly from the main portion of the block to urge the rear roller of the rollers 77 towards the forward roller of the rollers 77 so that the rollers are actually pressing in opposite directions against the support columns 73. Since the rear roller of the rollers 77 is mounted between the upper and lower rollers of the front rollers 77, it serves to maintain all of the rollers in engagement with the support columns 73. Also, because of this arrangement, the carriage block always tracks vertically up and down the support columns in the same relationship. The spring loading of the rollers in this manner also makes it possible to maintain this same alignment even though some wear may occur on the rollers. As wear occurs on the rollers, the point of contact with the support column will change without changing the centering of the carriage block.

Means is provided for controlling the rate of fall of the carriage block 76. In this embodiment shown in the drawings, such means is provided on the support rods and consists of friction members 91 of suitable material such as Teflon which are provided with a convex end surface engaging the carriage block. The Teflon members 91 are slidably mounted for horizontal movement in the support columns and yieldably urged into engagement with the carriage block by springs 92 seated in counterbored cap screws 93 threaded into the support column. As the pressure on the concave surfaces of the Teflon members 91 is increased by inward adjustment of the cap screws 93, the amount of surface of the Teflon member 91 is increased to thereby increase the amount of drag on the carriage block to thereby decrease the rate of fall.

Additional means is provided for a controlled lowering of the carriage block and also for raising of the carriage block. This means consists of fluid means comprised of a pneumatic cylinder 101 seated in a bore 102 provided in the pedestal base 71. The pedestal base is provided with a fitting 103 connected into a passage 104 leading into the pneumatic cylinder 101. The fitting 103 is provided with an orifice (not shown) for controlling the rate of flow of fluid into and out of the cylinder 101. A cap 106 is mounted on the other end of the cylinder 101 and serves to make the cylinder 101 fluid-tight. A piston 107 is mounted within the cylinder for reciprocatory movement and is provided with an O-ring 108 mounted in an annular groove in the piston. A piston rod 109 connected to the piston extends upwardly through the cap 106 and is connected to a lift rod 110. The lift rod 110 extends upwardly through the carriage block 76 and is adjustable vertically of the carriage block by hand nuts 111 provided on the upper and lower ends of the block and threadably engaging the lift rod 110. A latch rod 112 is threaded into the lift rod 109 and extends upwardly therefrom. The latch rod 112 is provided with an annular groove 113 lying in a horizontal plane, an inwardly tapered portion 114 and a shoulder 116. A collar 117 is mounted on the upper end of the latch rod 112.

Figure 8A:
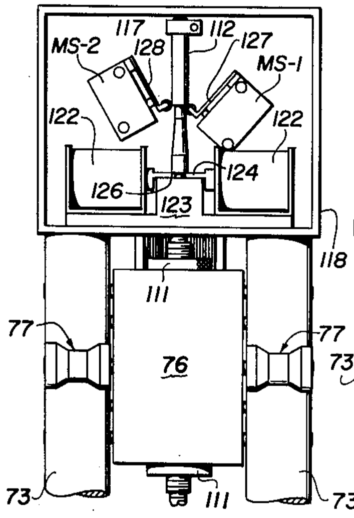
FIGURES 8A, 8B and 8C show various positions of certain portions of our thermocompression lead bonding machine utilized in forming a thermocompression bond.
Figure 8B:
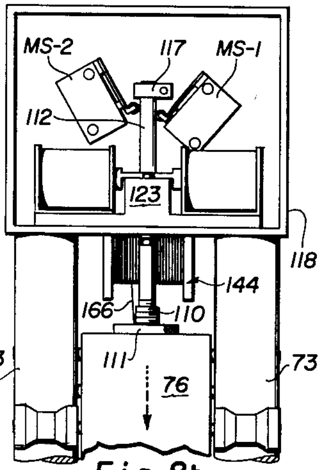
Figure 8C:
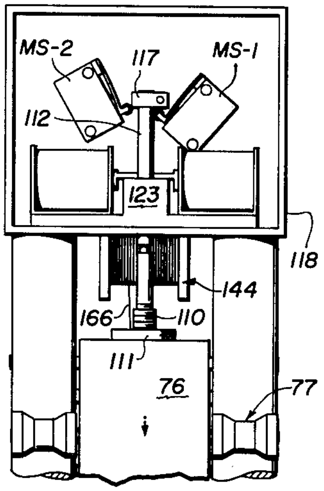

A latch mechanism housing 118 is mounted on top of the support columns 73 by suitable means such as screws (not shown). The housing 118 consists of a U-shaped member 119 which is secured to the top of the support column by suitable means such as screws (not shown). The housing is completed by U-shaped cover member 121. A pair of solenoids 122 are mounted within the housing on a block 123. Each of the solenoids is provided with a plunger in the form of a latch 124 which rides on a surface 126 provided on the block 123. The latches 124 are adapted to be seated in the groove 113 or are adapted to engage the shoulder 116 as shown in FIGURES 8A and 8B. A pair of Microswitches MS–1 and MS–2 are also mounted in the housing 118 and are provided with operating arms 127 and 128, respectively, which engage various portions of the latch rod 112 as hereinafter described.

A U-shaped stage 131 is secured to the carriage block 76 by a pair of cap screws 132. A bearing block 133 is mounted in the forward end of the stage and carries a bushing 134 of suitable material such as brass which is adapted to receive a collet 136. The collet 136 is provided with a flange 137 which overlies the bearing block 133. A collet jam nut 138 is threaded on the upper portion of the collet and carries a ferrule 139 of suitable material such as plastic. The ferrule is adapted to engage the bonding tool which, in this case, has been shown to be a capillary tube 141, as the collet jam nut is threaded onto the collet.

Figure 4:
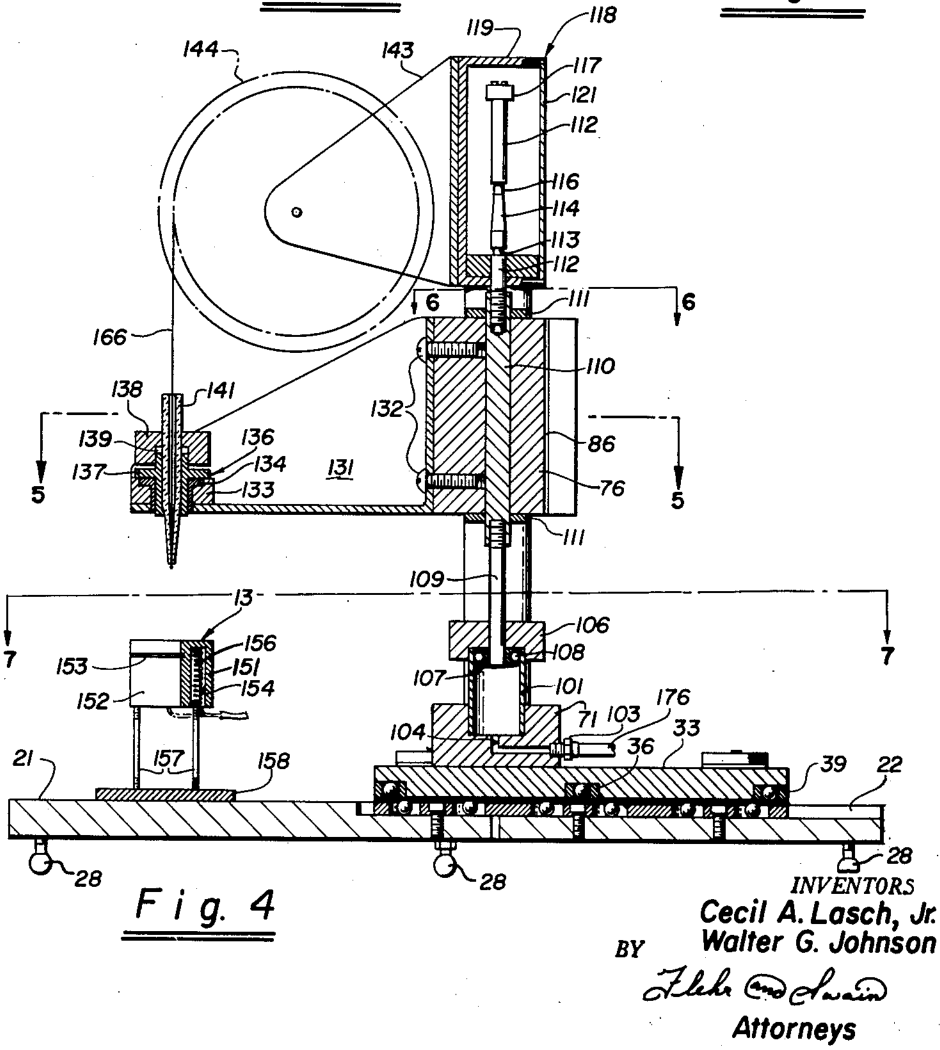
FIGURE 4 is a cross-sectional view of our thermocompression bonding machine.
Figure 7:
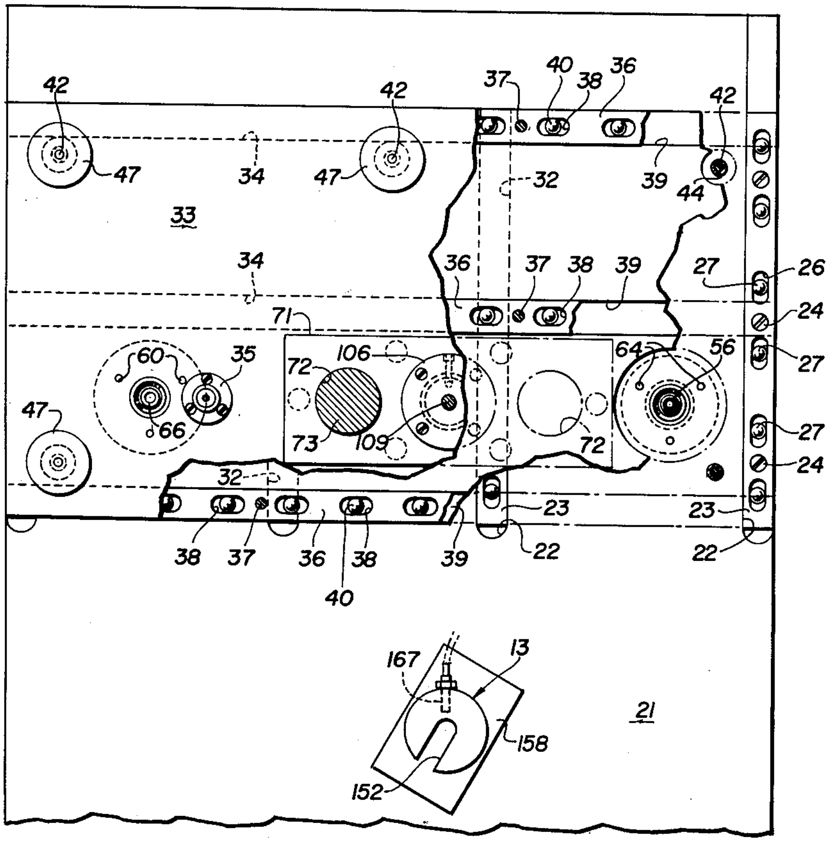
FIGURE 7 is a cross-sectional view taken along the line 7—7 of FIGURE 4 with certain portions broken away.

A U-shaped reel holder bracket 143 is mounted on the housing 118. A reel 144 is mounted in the bracket by suitable means so that lead wire wound thereon can be payed off directly into the capillary tube 141, as shown in FIGURE 4. The reel is preferably provided with means (not shown) by which the amount of friction retarding rotation of the reel can be adjusted.

The header holder 13 consists of a heater block 151 of substantial mass which is provided with a U-shaped vertical slot 152 which is adapted to receive a header. A horizontal groove 153 is provided in the block for receiving the outturned flange of the header. The heater block 151 is provided with bores 154 which accommodate electrical heaters 156 to maintain the heater block at a predetermined temperature as hereinafter described. The heater block is supported by four support rods 157 of suitable material such as stainless steel, threaded into a plate 158 secured to the carriage plate 38.

Circuitry for operating the machine is shown in FIGURE 10 and consists of the two Microswitches MS–1 and MS–2, hereinbefore described. The circuitry also includes two additional Microswitches MS–3 and MS–4 which are in the operating handle 52. It also includes the two latching solenoids 122 which are mounted in the housing 118. A timer 161, a relay 162, a solenoid operated valve 163, and a temperature control unit 164 are mounted in the control cabinet 16. The heaters 156 are connected to the temperature control unit through a variable transformer 170. A thermocouple 167 is mounted in the header block and is also connected to the temperature control unit. An on-off switch 168 and a fuse 169 are also mounted in the control cabinet.

Operation of our lead bonding machine may now be briefly described as follows. Let it be assumed that it is desired to use gold wire for leads and that gold wire of a suitable diameter such as two mils has been mounted on the reel 144. Also, let it be assumed that it is desired to perform a bonding operation well known to those skilled in the art as "thermocompression bonding," in which a capillary tube is utilized for pressing a gold bead against an element of a suitable material such as aluminum and maintaining a temperature and pressure so that a metallurgical bond is established between the gold lead and the element. As is well known, this bond is established below the normal eutectic temperature for the metals.

Now let it be assumed that it is desired to utilize our machine to perform such a bonding operation. Let it be assumed that the machine is in the position shown in FIGURES 8A and 9A. The operator first places the header 171 in the header holder 13 by sliding the flange of the header into the groove 153. Now assuming that the capillary tube 141 is roughly in the proper position because of previous operations having been performed by the same operator, the operator next pushes the button 53 in the operating handle 52. This causes operation of the latching relay 162 to close its upper and lower contacts. Closing the lower contacts causes energization of the solenoid operated valve 163 to close off the supply of compressed air from the air supply 174 to the air supply pipe 176 connected to the fitting 103. Closing of the upper contacts of relay 162 also causes energization of the latching solenoids 122 to cause retraction of the latches 124 from the groove 113 to permit the carriage block with the stage secured thereto to drop by the force of gravity. The rate of drop is controlled by the yieldably urged friction members 191, as hereinbefore described. The rate of drop is also controlled by the air flow from the pneumatic cylinder 101. The air is bled off in a controlled manner through the orifice in fitting 103.

Figures 9A, 9B, 9C:
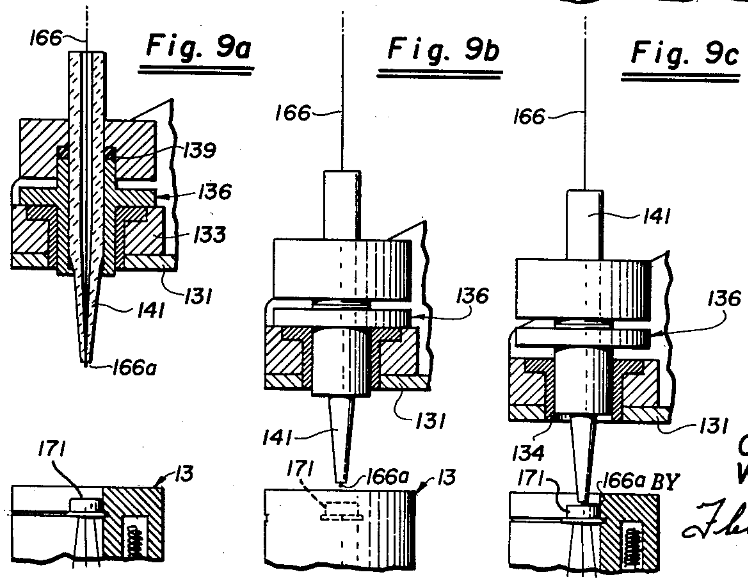
FIGURES 9A, 9B and 9C show other portions of our machine in the same positions for forming a thermocompression bond.

As soon as the stage begins to drop, the Microswitch MS–2 is operated by the operating arm 127 sliding over the shoulder 116 of the latch rod. This de-energizes the solenoids 122 by breaking the circuit for the solenoids 122 and places the solenoids under control of the Microswitch MS–4, as hereinafter described. Upon de-energization of the solenoids 122, spring means (not shown) provided in the solenoids cause the latches 124 to be yieldably urged into engagement with the latch rod so that the shoulder 116 will engage the latches 124 to limit the downward travel of the stage and the carriage block. The shoulder 116 is positioned so that the downward travel of the capillary tube is arrested at a point slightly above the header 171, as shown in FIGURE 9B.

After the Microswitch MS–3 has been operated by the operating button 53 and the stage 131 carrying the bonding tool in the form of a capillary tube has been lowered to a position generally overlying the header 171 in the header holder 13 and is in relative close proximity thereto, the position of the carriage plate 33 is shifted by use of the operating handle 52 to position the gold bead 166*a* on the gold wire 166 so that it immediately overlies the element on the header to which a lead is to be bonded. The proper positioning of this gold bead is facilitated by the use of the microscope 14 which is provided with a lamp 15. The carriage plate 33 and the capillary tube 141 carried thereby can be shifted in a sidewise direction or a back and forth direction by movement of the operating handle 52, as hereinbefore described, to properly position the gold bead.

After the capillary tube carrying the gold wire is properly positioned so that the gold bead on the end of the wire immediately overlies the area to which the lead is to be bonded, the second operating button 54 is depressed to operate the Microswitch MS–4. Operation of the Microswitch MS–4 causes energization of the solenoids 122 through the Microswitch MS–2 in the position shown and through the Microswitch MS–1 which has been shifted to the right hand position, as shown in FIGURE 10, by the first lowering of the latch rod caused by operation of the push button 53.

The latches 124 are retracted from the shoulder 116 to permit the carriage block to drop. Here again, the rate of fall of the carriage block is controlled by the friction members 91, as well as by the release of air from the pneumatic cylinder 101 through the bleed orifice provided in the fitting 103.

As the carriage block 76 and the stage 131 carried thereby are dropped, the capillary tube draws with it the lead wire 166 from the reel 144. This occurs because the bead 166*a* on the end of the lead is substantially greater in diameter than the diameter of the capillary opening in the tube 141. The carriage block and the stage 131 carried by the piston 107 continues to drop until the piston 107 comes to rest at the bottom of the pneumatic cylinder 101. As this occurs, the entire tool holder assembly consisting of the collet 136, the jam nut 138 and the ferrule 139 are raised as a unitary assembly upwards in the bushing 134 a slight distance as shown in FIGURE 9C because prior to the time the piston 107 comes to rest at the bottom of the cylinder 101, the bead 166*a* engages the header 171 so that the entire weight of the tool holder assembly together with the capillary tube is applied to the end of the bead 166*a* to serve as means to apply a predetermined pressure as, for example, 5000 p.s.i. to the bead.

During the time that all of these operations have been occurring, the temperature control unit 164 has maintained the heater block 151 at a predetermined temperature as, for example, 325° F.

As the carriage block 76 drops to its lowermost position, the Microswitch MS–2 is operated by the collar 117 to shift its contacts from the left to the right as viewed in FIGURE 10 to start operation of the motor in the timer 161. The timer is set for a predetermined time interval as, for example, six seconds, during which the metallurgical bond is completed. When this time interval has elapsed, the contacts of the timer shown in FIGURE 10 are closed to cause energization of the latching relay 162 to open both of its sets of contacts. The upper set of contacts de-energizes the relay itself, whereas the lower set of contacts de-energizes the solenoid operated valve 163 to permit it to return to its initial position and also to permit air to enter the pneumatic cylinder 101 to cause the piston 107 to lift the carriage block, the stage, the tool holder assembly, and the capillary tube upwardly to its uppermost position so that the latches 124 can seat in the groove 113 of the latch rod 112.

During the raising of the capillary tube, the lead remains connected to the header and, for that reason, the capillary tube travels upwardly on the wire lead.

Thereafter, the lead 166 is cut by suitable means such as by a hydrogen torch at a suitable position to leave the proper length of lead connected to the header. Cutting of the lead in this manner causes a bead to be formed on each of the cut ends of the lead because of surface tension in the molten metal as is well known to those skilled in the art. It is for this reason that the next time the capillary tube is lowered, it carries with it the lead wire 166 because the bead 166*a* formed on its lower ends cannot pass through the small capillary in the capillary tube.

The machine is now ready for performing the next bonding operation which may be performed in the same manner as hereinbefore described merely by operating the two control buttons 53 and 54 in the operating handle 52 and by proper positioning of the capillary tube so that the bead provided on the end of the lead is lowered into proper engagement with the desired element on the header.

We have found that our machine makes it possible to form very good bonds consistently and with rapidity. This is possible because no vibration is imparted to the machine during operation of the machine so that proper positioning is made very easy. The carriage block drops by gravity and is lowered in a controlled manner by the friction member 91 and by the bleeding of air from the pneumatic cylinder 101. During this time, the solenoids 122 are not energized and, therefore, do not vibrate or jar the machine. The solenoids are only energized when it is desired to release the stage from one position to permit it to drop to the next lower position. The solenoid operated valve 163 is mounted in a control cabinet remote from the machine so that it cannot jar or cause vibration of the machine.

Although, the fluid operated means shown has been described as being pneumatically operated it should be pointed out that it may be desirable to use a substantially noncompressible fluid such as a hydraulic fluid to make possible a greater control over the rate of fall and the rate of raising of the carriage block carrying the tool. Also, it should be pointed out that although our machine has been described for forming thermocompression bonds on transistor headers, our machine is readily adjustable for forming bonds on other types of devices such as diodes, strain gauges, micromodules, etc.

It is apparent from the foregoing that we have provided a new and improved thermocompression lead bonding machine which is particularly useful when capillary tubes are utilized as the bonding tool. The machine is sturdily and yet economically constructed. Its operation is relatively fool-proof so that it can be operated by relatively unskilled labor.

We claim:

1. In a thermocompression lead bonding apparatus for bonding leads to an element, an element holder carrying the element, a bonding tool, a bonding tool holder carrying said bonding tool, means for supporting the bonding tool holder, means for lowering the bonding tool holder and the bonding tool at a controlled substantially uniform rate in two separate steps with the first step being substantially greater than the second step to cause the bonding tool to come into engagement with the lead and to urge the lead into engagement with the element in the element holder, and means for shifting the relative positions of the tool and the element holder with respect to each other so that the tool and the element can be precisely positioned with respect to each other after completion of the first step by the bonding tool.

2. A thermocompression lead bonding apparatus as in claim 1 wherein said means for lowering the bonding tool holder and the bonding tool consists of a pair of vertical support columns, a carriage block slidably mounted between said support columns for vertical movement, and a plurality of rollers on opposite sides of said carriage block and being disposed on opposite sides of the support column for rolling movement up and down the support column, said carriage block having means for springing said rollers into engagement with the support columns.

3. A thermocompression lead bonding apparatus as in claim 2 wherein said means on said carriage block for springing said rollers into engagement with the support columns consists of a pair of diagonal slots and means mounted in the carriage block for springing portions of said block adjacent said slots out of their normal positions to urge the rollers into engagement with the support columns.

4. A thermocompression lead bonding apparatus as in claim 1 wherein said means for shifting the relative position of the tool and the element holder with respect to each other consists of a base plate, the element holder being supported by the base plate, a carriage plate supported upon the base plate for sidewise and back and forth movement with respect to the base plate, the bonding tool holder being supported upon the carriage plate, and lever operated means for shifting the position of the carriage plate relative to the base plate.

5. In a thermocompression lead bonding apparatus for bonding a lead wire to an element, a base plate, an element holder mounted on said base plate, a carriage plate mounted on said base plate for sidewise and back and forth movement on said base plate, an operating lever disposed in said base plate and said carriage plate for shifting the relative positions of the carriage plate with respect to the base plate, a pair of support columns mounted on said carriage plate, a carriage block slidably mounted between said support columns for vertical movement, a tool holder carried by said carriage block, a tool mounted in said tool holder, means for feeding the lead wire into the tool holder, latch operated means for releasing said carriage block to permit it to drop by force of gravity, and means for controlling the rate of fall of said carriage block and the tool holder carried thereby.

6. A thermocompression lead bonding apparatus as in claim 5 wherein said tool is in the form of a glass capillary tube and wherein a reel is mounted upon said support columns, the lead wire being wound on the reel and extending through the capillary tube.

7. A thermocompression lead bonding apparatus as in claim 5 wherein an idler plate is disposed between the base plate and the carriage plate and wherein bearing members are disposed between the base plate and the idler plate and between the carriage plate and the idler plate.

8. A thermocompression lead bonding apparatus as in claim 7 wherein said bearing members between the idler plate and the base plate and between the idler plate and the carriage plate consists of a plurality of elongate members having elongate slots therein and ball bearings seated in said slots, and wherein slots seated on said bearing members are formed in the base plate, the idler plate and the carriage plate.

9. In a thermocompression lead bonding apparatus for bonding leads to an element, a base, an element holder mounted on said base, a bonding tool, a bonding tool holder carrying said bonding tool, means for carrying said bonding tool holder mounted on said base, said means for carrying said bonding tool holder including means for lowering the bonding tool holder at a controlled rate to lower the bonding tool into engagement with the lead and to urge the lead into engagement with the element in the element holder to cause a bond to be formed between the lead and the element by use of pressure applied by the bonding tool, said means for carrying said bonding tool holder permitting vertical movement of the bonding tool holder and the bonding tool carried thereby the means for carrying the bonding tool holder being lowered sufficiently so that the bonding tool and bonding tool holder are raised in the means for carrying the bonding tool holder so that the pressure applied by the bonding tool to the lead is determined solely by the weight of the bonding tool and bonding tool holder, a microscope mounted on the base, means disposed adjacent the element holder and throwing light on the element, and means for shifting the relative positions of the tool and the element holder with respect to each other.

10. A thermocompression lead bonding apparatus as in claim 9 together with heater means for maintaining said element holder at a predetermined temperature.

11. A thermocompression lead bonding apparatus as in claim 9 wherein said means for lowering the bonding tool holder and the bonding tool at a controlled rate includes pneumatic means, said pneumatic means comprising a pneumatic cylinder, a piston disposed in said cylinder and supporting said bonding tool holder, an air supply and solenoid operated valve means for controlling the supply of air to said pneumatic cylinder and the exhaust of air from said pneumatic cylinder.

12. In a thermocompression lead bonding apparatus for bonding leads to elements, a base plate, an element holder mounted on the base plate, a carriage plate mounted on said base plate for sidewise and back and forth movement with respect to said base plate, a manipulator lever connected to said base plate and said carriage plate for shifting the position of said carriage plate with respect to said base plate, a pair of vertical support columns mounted on said carriage plate, a carriage block mounted between said support columns for vertical movement therebetween, a bonding tool, a bonding tool holder carrying said bonding tool and fixed to said carriage block, a fluid cylinder mounted on said carriage plate, a piston disposed in said carriage plate, a piston rod connected to said piston and supporting said carriage block, a latch rod connected to said carriage block, said latch rod having a pair of detents, solenoid operated latching means adapted to engage said detents, a supply of fluid, a solenoid operated valve controlling the flow of fluid to and from said fluid cylinder, a relay having a plurality of contacts, first and second switches engaging said latching rod and adapted to be operated thereby, first and second switches carried in the handle of the manipulator lever, a timer and circuitry interconnecting said solenoid operated valve, said relay, said solenoid operated latching means, said timer, said first and second switches in said manipulator lever, and said first and second switches adapted to be operated by said latch rod whereby upon operation of said first switch in said manipulator lever the solenoid operated valve is energized to cut off the supply of fluid to the fluid cylinder and to permit fluid to bleed from said fluid cylinder at a controlled rate and said solenoid-operated latch means is energized to release the latch rod to permit a first drop of the carriage block, said first switch adapted to be operated by the latch rod being operated upon release of the latch rod by the solenoid-operated latch means to de-energize the solenoid-operated latch means to permit the solenoid-operated latch means to return to its normal position to permit the solenoid-operated latch means to be engaged by the second detent in the latch rod, and upon operation of said second switch in said manipulator lever, solenoid-operated latch means is again energized to release the latch rod to permit a second drop of the carriage block to drop the tool into engagement with the element, said second switch adapted to be operated by the latch rod being operated upon the second drop of the carriage block to initiate operation of the timer, the timer after a predetermined interval energizing the relay and causing energization of the solenoid operated valve to raise the carriage block and the tool carried thereby to their uppermost positions.

13. A thermocompression lead bonding apparatus as in claim 12 together with automatically operated means for maintaining said element holder at a predetermined temperature.

14. In a thermocompression lead bonding apparatus for bonding a lead wire to an element, a base plate, an element holder mounted on said base plate, a carriage plate mounted on said base plate for sidewise and back and forth movement on said base plate, an operating lever disposed in said base plate and said carriage plate for shifting the relative positions of the carriage plate with respect to the base plate, a pair of support columns mounted on said carriage plate, a carriage block slidably mounted between said support columns for vertical movement, a tool holder carried by said carriage block, a tool mounted in said tool holder, means for feeding the lead wire into the tool holder, latch operated means for releasing said carriage block to permit it to drop, and means for controlling the rate of fall of said carriage block and the tool holder carried thereby, said latch operated means consisting of a latch rod secured to the carriage block, said latch rod being provided with a pair of detents, and solenoid-operated latch means for engaging the detents, one of the detents being positioned to retain the carriage block and the tool carried thereby in an uppermost position and the other of the detents being positioned so that the carriage block and tool carried thereby will be disposed in relatively close proximity to the element in the element holder to permit proper alignment of the lead wire with the element.

15. In a thermocompression lead bonding apparatus for bonding leads to an element, an element holder for carrying the element, a bonding tool, a bonding tool holder carrying said bonding tool, means for supporting the bonding tool holder, said means for supporting the bonding tool holder including means for moving the bonding tool holder and the bonding tool carried thereby towards the element, means for stopping said bonding tool holder and bonding tool when the bonding tool is in relatively close proximity to the element but spaced from the element, means for shifting the relative positions of the bonding tool and element holder with respect to each other to thereby properly position the bonding tool with respect to the element carried by the element holder while said bonding tool is in relatively close proximity to the element, said means for supporting the bonding tool holder also including means for releasing the means for stopping the bonding tool holder after it has been stopped and driving the bonding tool carried by the bonding tool holder at a uniform controlled rate into engagement with the lead and to urge the lead into engagement with the element in the element holder.

16. A thermocompression lead bonding apparatus as in claim 15 together with a drum carrying a quantity of bonding lead wrapped thereon, the drum being rotatably mounted upon the means for supporting the bonding tool holder and wherein the bonding tool comprises a vertically disposed capillary tube through which the bonding lead extends downwardly from the reel.

17. In a thermocompression lead bonding apparatus for bonding a lead wire to an element, a base plate, an element holder mounted on said base plate, a carriage plate mounted on said base plate for sidewise and back and forth movement on said base plate, an operating lever disposed in said base plate and said carriage plate for shifting the relative positions of the carriage plate with respect to the base plate, a bonding tool, a bonding tool holder carrying said bonding tool, means mounted upon said base plate for supporting the bonding tool holder and means for lowering the bonding tool holder and the bonding tool at a controlled rate to cause the bonding tool to come into engagement with the lead and to urge the lead into engagement with the element in the element holder to thereby apply pressure between the lead and the element for use in effecting a bond between the lead and the element.

18. In a thermocompression lead bonding apparatus for bonding leads to an element, an element holder, a bonding tool, a bonding tool holder carrying said bonding tool, means for supporting the bonding tool holder, means for lowering the bonding tool holder and the bonding tool at a controlled rate in two separate steps with the first step being substantially greater than the second step to cause the bonding tool to come into engagement with the lead and to urge the lead into engagement with the element in the element holder, means for shifting the relative positions of the tool in the element holder with respect to each other, said means for lowering the bonding tool and bonding tool holder at a controlled rate consisting of a pair of support columns, a carriage block mounted between said support columns for vertical movement therebetween, friction means disposed between the block and the support columns to control the rate of drop of the carriage block, and fluid means cooperating with said friction means for controlling the rate of drop of the carriage block and for raising said carriage block from its lowermost position to its uppermost position.

19. In a thermocompression lead bonding apparatus for bonding leads to an element, an element holder, a bonding tool, a bonding tool holder carrying said bonding tool, means for supporting the bonding tool holder, means for lowering the bonding tool holder and the bonding tool at a controlled rate in two separate steps with the first step being substantially greater than the second step to cause the bonding tool to come into engagement with the lead and to urge the lead into engagement with the element in the element holder, and means for shifting the relative positions of the tool and the element holder with respect to each other, said bonding tool and bonding tool holder being mounted for vertical movement relative to the means for supporting the bonding tool and the bonding tool holder, the bonding tool and the bonding tool holder being lowered so that the bonding tool engages the element and thereafter the means for supporting the bonding tool holder is lowered still further so that the bonding tool and the bonding tool holder are raised relative to the means for supporting the bonding tool holder so that the weight upon the lead in engagement with the element will be only the weight of the bonding tool and the bonding tool holder.

20. In a thermocompression lead bonding apparatus for bonding leads to an element, an element holder, a bonding tool, a bonding tool holder carrying said bonding tool, means for supporting the bonding tool holder for vertical movement, means for retaining said bonding tool holder in an uppermost position, means for releasing said bonding tool holder from said uppermost position to permit the bonding tool holder and the bonding tool carried thereby to drop by force of gravity, and fluid means for controlling the rate of fall of said bonding tool holder and the bonding tool carried thereby, said means for supporting the bonding tool holder including means for permitting vertical movement of the bonding tool holder and the bonding tool carried thereby relative to the means for supporting the bonding tool holder, the means for supporting the bonding tool holder and the bonding tool dropping sufficiently so that the bonding tool and the bonding tool holder are raised with respect to the means for supporting the bonding tool holder when the bonding tool comes into engagement with the lead and urges the lead against the element so that the pressure applied by the bonding tool upon the lead to bond the lead to the element is determined solely by the weight of the bonding tool and the bonding tool holder.

21. In a thermocompression lead bonding apparatus for bonding leads to an element, an element holder, a bonding tool, a bonding tool holder carrying said bonding tool, means for supporting the bonding tool holder, means for driving the bonding tool holder and the bonding tool carried thereby to cause the bonding tool to come into engagement with the lead and to urge the lead into engagement with the element in the element holder, said means for supporting the bonding tool holder permitting relative movement between the bonding tool holder and the means for supporting the bonding tool holder, said means for supporting the bonding tool holder being moved sufficiently so that the bonding tool holder and the bonding tool carried thereby are shifted in position relative to the means for supporting the bonding tool holder, and means comprising at least the mass of the bonding tool and the bonding tool holder for applying a predetermined force to the bonding tool as the bonding tool and the bonding tool holder are shifted relative to the means for supporting the bonding tool holder to thereby aid in the establishment of a bond between the lead and the element.

22. In a lead bonding apparatus for bonding leads to an element, an element holder for carrying the element, a bonding tool, a bonding tool carrying said bonding tool holder, means for driving said bonding tool and bonding tool holder carried thereby towards the element in the element holder, means for arresting travel of the bonding tool holder and the bonding tool at a point only a slight distance away from the element so that the bonding tool is in relatively close proximity to the element, means for shifting the relative positions of the bonding tool and the element with respect to each other so as to precisely position the same with respect to each other while the bonding tool is in close proximity to the element, and means for releasing the bonding tool holder and the bonding tool carried thereby and driving the same towards the element to cause the tool to come into engagement with the lead and to urge the lead into engagement with the element in the element holder to thereby aid in the establishment of a bond between the lead and the element.

23. Apparatus as in claim 22 wherein said bonding tool is a glass capillary tube and wherein the lead extends through the capillary tube.

24. Apparatus as in claim 22 wherein the bonding tool holder and the bonding tool carried thereby are driven at a substantially uniform controlled rate.

References Cited in the file of this patent

UNITED STATES PATENTS

| | | |
|---|---|---|
| Re. 17,949 | Chubb | Feb. 3, 1931 |
| 2,354,028 | Kershaw | July 18, 1944 |
| 2,404,730 | Johansson et al. | July 23, 1946 |
| 2,602,872 | Ziegler | July 8, 1952 |
| 2,672,838 | Heidenreich et al. | Mar. 23, 1954 |
| 2,701,291 | Cowles | Feb. 1, 1955 |
| 2,795,687 | Hall et al. | June 11, 1957 |
| 2,928,931 | Hoopes et al. | Mar. 15, 1960 |
| 2,969,453 | Page | Jan. 24, 1961 |
| 2,986,625 | Houda et al. | May 30, 1961 |